April 17, 1962  O. I. KAUKONEN  3,029,527

THREE POINT VISUAL TEACHING AID

Filed Dec. 8, 1958

INVENTOR.

OLIVER I. KAUKONEN
BY
*Victor J. Evans & Co.*
ATTORNEYS 3,029,527
THREE POINT VISUAL TEACHING AID
Oliver I. Kaukonen, % Eureka Bible & Book House,
12 5th St., Eureka, Calif.
Filed Dec. 8, 1958, Ser. No. 778,922
4 Claims. (Cl. 35—23)

This invention relates to a teaching aid.

The object of the invention is to provide a device which is adapted to be used for facilitating the teaching of lessons such as religious lessons, scriptures, or the like.

Another object of the invention is to provide a teaching aid which is especially suitable for use in teaching persons subjects such as religious subjects, and wherein the teaching aid includes a base that has a plurality of flaps or leaves hingedly or pivotally connected thereto and wherein each flap can be moved to different positions so as to expose various portions of printed matter or indicia on the device.

A further object of the invention is to provide a teaching aid which is extremely simple and inexpensive to manufacture.

Other objects and advantages of the invention will be apparent in the course of the following description.

In the accompanying drawing, forming a part of this application, and in which like numerals are used to designate like parts throughout the same.

Figure 5:
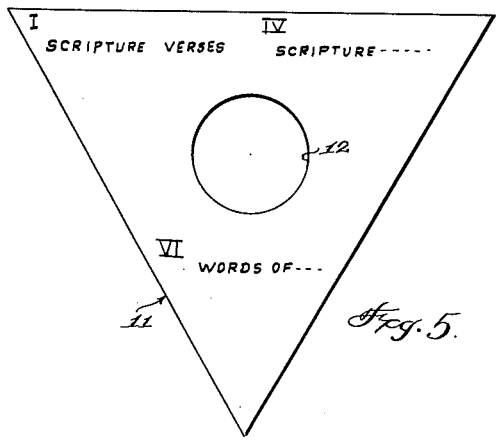
FIGURE 5 is a plan view of the base per se.
Figure 6:
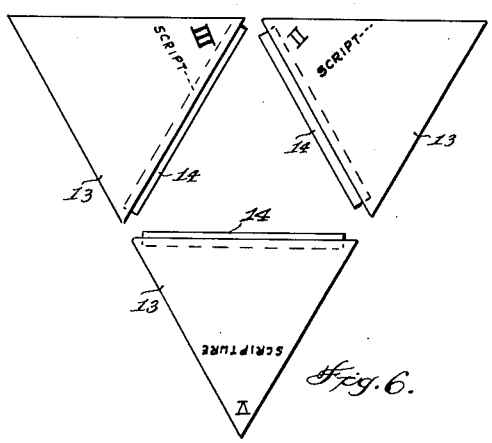
FIGURE 6 is a plan view illustrating the three movable flaps.

Referring in detail to the drawing, the numeral 10 indicates the visual teaching aid of the present invention which is shown to comprise a triangular-shaped base 11, FIGURE 5. The base 11 is provided with a central circular aperture or opening 12.

There is further provided three triangular-shaped flaps or leaves 13, and each of these flaps 13 are hingedly or pivotally connected to the base 11 by means of hinge strips 14. The base 11 is adapted to be provided with indicia or markings such as the indicia 15 and 16, and the base may have such indicia on both sides thereof. Similarly, the three flaps 13 are also each provided with indicia on both sides thereof.

Figures 1, 2:
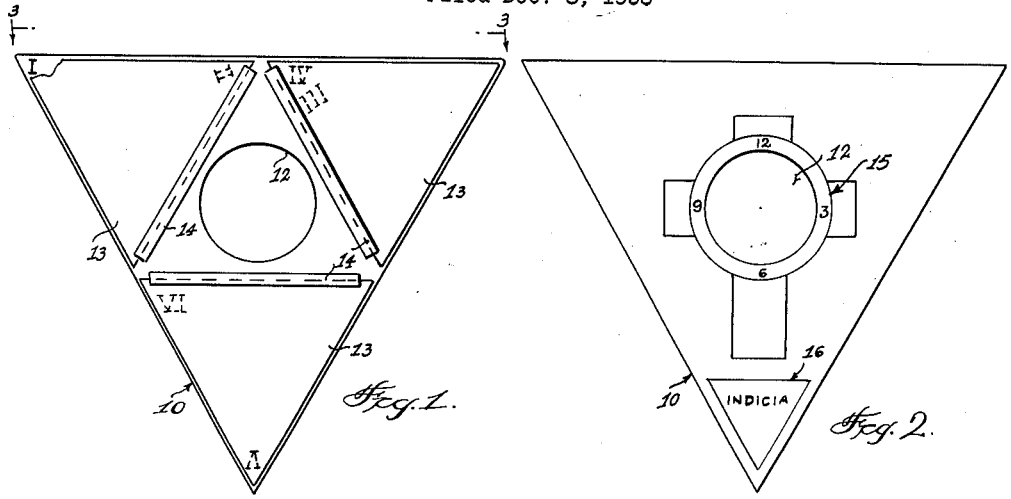
FIGURE 1 is a plan view illustrating the teaching aid of the present invention.
FIGURE 2 is a view similar to FIGURE 1, but looking at the opposite side.
Figure 3:
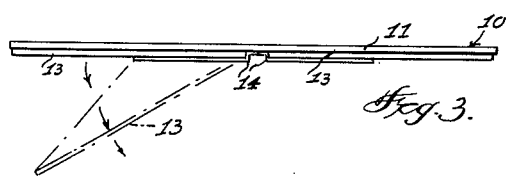
FIGURE 3 is an edge view of the device.
Figure 4:
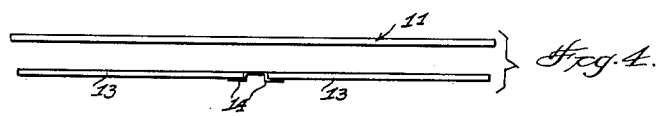
FIGURE 4 is a view similar to FIGURE 3 but showing the parts separated.

From the foregoing, it is apparent that there has been provided a visual teaching aid which can be used for various types of teaching as for example it can be used for facilitating the teaching of religious subjects, scriptures or the like. According to the present invention the base 11 is of triangular-formation and the three flaps 13 are also of triangular formation, and these flaps are hingedly connected to the base 11 as at 14. Thus, the flaps 13 can be arranged as shown in FIGURE 1, or else they can be moved to a position such as that shown in broken lines in FIGURE 3, and they can also be moved so that they will be in alignment with the aperture 12. When the three flaps 13 are in alignment or registry with the aperture 12 and with each other, these flaps will be superimposed with respect to each other so that they will be contiguous to each other. Thus with the base in position as shown in FIGURE 5 and the flaps numbered in sequence such as—II, III and V, the scripture verses may be read in unison. The aperture 12 can function as a hand hold, and it also functions as a window whereby when the flaps are selectively positioned in alignment with the aperture 12 the indicia or printed matter on the flaps 13 can be readily observed through this aperture, as for example when the flaps 13 are in alignment with the aperture.

When using the device, the flaps may be moved successively from the position shown in FIGURE 1. That is, when using the device as a teaching aid, one of the flaps 13 can be pivoted so as to expose the printed matter therebelow, and then the next flap can be moved, and then the last flap can be lifted or swung on its hinge 14, and this arrangement provides a highly effective means for teaching various subjects such as religious subjects.

Since the flaps 13 are of triangular formation, it will be seen that when the flaps are in the position in FIGURE 1, they will coincide with the outer corner portions of the base so as to effectively cover up the printed matter or indicia on these portions of the base whereby the user will not read or study these portions until the proper time is at hand.

The parts can be made of any suitable material and in different shapes or sizes.

The opening or aperture 12 may have different shapes or sizes and as for example it may be made circular, or it may be heart-shaped, square, hexagonal, octoganal, triangular or the like. The particular printed matter or indicia on the parts will of course vary with the lesson being taught or the subject matter being taught.

In use, the flaps are adapted to be folded from the position shown in FIGURE 1 to an inner position as the lessons or lectures are proceeded with so as to impart a message through the eye as well as through hearing as the lectures proceed. The parts can be folded back and forth so as to provide a highly effective manner of teaching persons the desired subject matter.

Minor changes in shape, size and rearrangements of details coming within the field of invention claimed may be resorted to in actual practice, if desired.

I claim:

1. In a device of the character described, an equilateral triangular-shaped base provided with a central aperture therein, a plurality of similar triangular-shaped flaps of a size to cover only a portion of the base hingedly connected respectively to one side of the base so that a flap will overlap each angle of said base, said flaps having indicia on both sides thereof and said flaps being separately movable from an extended position contiguous to the base to a folded position on said base in alignment with the aperture so that when one side of the base is being viewed the indicia on the flaps may be selectively visible through the aperture and may be read, and when the opposite side of the base is being viewed and the flaps are arranged in superimposed relation with respect to each other the indicia on the opposite side of the flaps may be selectively read as when they are aligned with said aperture.

2. The structure as defined in claim 1 wherein said aperture is of circular formation.

3. The structure as defined in claim 1 wherein said base has indicia thereon.

4. In a device of the character described, an equilateral triangular-shaped base provided with a central aperture therein, a plurality of similar triangular-shaped flaps of a size to cover only a portion of the base hingedly connected respectively to one side of the base so that a flap will overlie each angle of said base, said flaps having indicia on both sides thereof and said flaps being separately movable from an extended position contiguous to the base to a folded position on said base in alignment with the aperture so that when one side of the base is being viewed the indicia on the flaps may be selectively visible through the aperture and may be read, and when the opposite side of the base is being viewed and the flaps are arranged in superimposed relation with respect to each other the indicia on the opposite side of the flaps may be selectively read as when they are aligned with said aperture, said aperture being of circular formation, said base having indicia thereon, and said device adapted to be used as a teaching aid.

References Cited in the file of this patent

UNITED STATES PATENTS

| | | |
|---|---|---|
| 466,583 | Snyder | Jan. 5, 1892 |
| 750,711 | Shea | Jan. 26, 1904 |
| 1,082,155 | Herbst | Dec. 23, 1913 |
| 1,304,773 | Howell | May 27, 1919 |
| 1,417,828 | Hirsch | May 30, 1922 |
| 1,824,794 | Rohlfes | Sept. 29, 1931 |
| 2,795,067 | Walker | Jan. 11, 1957 |